(12) United States Patent
Roy et al.

(10) Patent No.: US 6,331,283 B1
(45) Date of Patent: Dec. 18, 2001

(54) LOW-TEMPERATURE AUTOTHERMAL STEAM REFORMATION OF METHANE IN A FLUIDIZED BED

(75) Inventors: Surajit Roy, Burnaby; Barry Pruden, Calgary; Alaa Adris, Calgary; John Grace, Calgary, all of (CA)

(73) Assignee: University Technologies International Inc. (CA)

( * ) Notice: Subject to any disclaimer, the term of this patent is extended or adjusted under 35 U.S.C. 154(b) by 0 days.

(21) Appl. No.: 09/397,638

(22) Filed: Sep. 16, 1999

Related U.S. Application Data
(60) Provisional application No. 60/100,520, filed on Sep. 16, 1998.

(51) Int. Cl.$^7$ ................................ C01B 3/02; C01B 3/26
(52) U.S. Cl. ........................................ 423/652; 423/648.1
(58) Field of Search ............................... 423/648.1, 652; 422/177

(56) References Cited

U.S. PATENT DOCUMENTS

| | | | |
|---|---|---|---|
| 3,108,857 | * 10/1963 | Gorin et al. | 423/652 |
| 5,229,102 | * 7/1993 | Minet et al. | 423/652 |
| 5,326,550 | 7/1994 | Adris et al. . | |
| 5,496,531 | * 3/1996 | Davis et al. | 423/648.1 |
| 5,588,974 | 12/1996 | Tiller et al. . | |
| 5,637,259 | * 6/1997 | Galuszka et al. | 423/652 |
| 5,639,431 | 6/1997 | Shirasaki et al. . | |
| 5,674,301 | 10/1997 | Sakai et al. . | |
| 5,714,092 | 2/1998 | Looii et al. . | |
| 5,741,474 | 4/1998 | Isomura et al. . | |
| 5,766,557 | 6/1998 | Luy et al. . | |
| 6,066,307 | * 5/2000 | Keskar et al. | 423/648.1 |

OTHER PUBLICATIONS

Bulewicz, E.M. et al., "Natural Gas Combustion in a Bed of Sand", proceedings Of the 14$^{th}$ International Conference on Fluidized Bed Combustion, May 11$^{th}$—14$^{th}$, 1997, p. 1103, The American Society of Mechanical Engineers, New York.

Hesketh, R.P., et al., Combustion of Methane and Propane in an Incipiently Fluidized Bed, Combustion and Flame 85:449–467 (1991).

Dennis, J.S., et al., The Ignition and Combustion of Propane/Air Mixtures in a Fluidized Bed, 19$^{th}$ Symposium (International) On Combustion/The Combustion Institute, 1982/pp. 1205–1212.

* cited by examiner

Primary Examiner—Wayne Langel
(74) Attorney, Agent, or Firm—Bennett Jones LLP

(57) ABSTRACT

A process of producing hydrogen by autothermal steam reformation of a hydrocarbon comprises the steps of providing a reactor vessel having a fluidized catalyst bed, introducing steam and a gaseous hydrocarbon, introducing oxygen, maintaining the bed temperature below the spontaneous combustion temperature of the hydrocarbon in a fluidized bed, and withdrawing hydrogen by means of a perm selective membrane. An apparatus for producing hydrogen comprises a reactor vessel, steam and hydrocarbon inlets, an oxygen inlet, a fluidized bed of catalyst within the reactor vessel and a perm selective membrane for withdrawing hydrogen from the reactor.

9 Claims, 4 Drawing Sheets

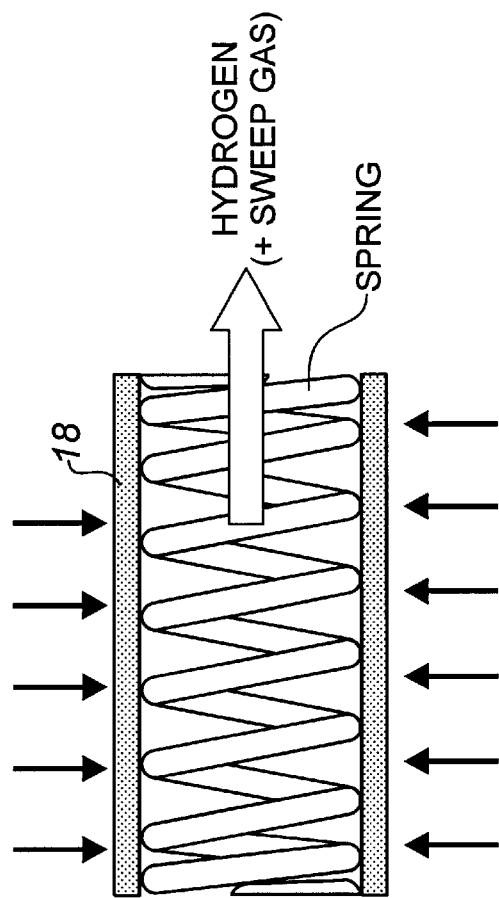
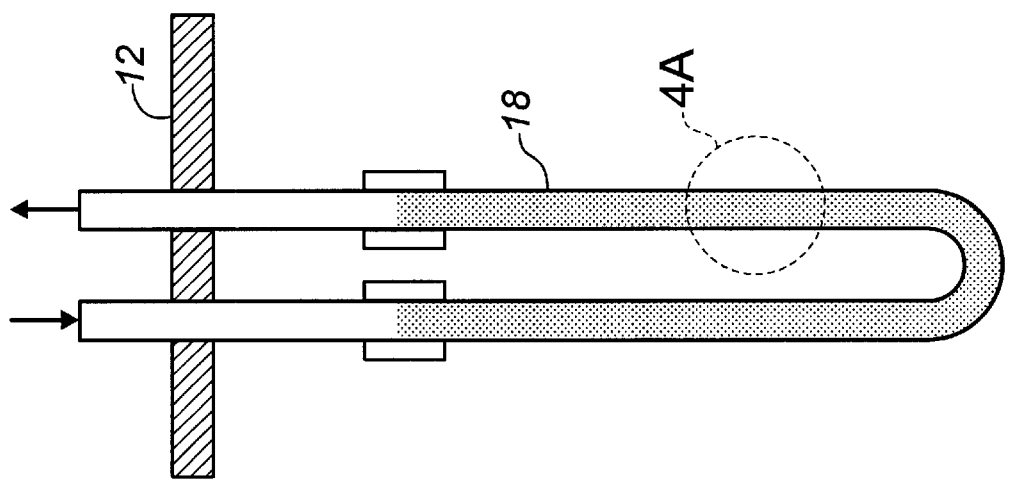
FIG. 4A
FIG. 4

LOW-TEMPERATURE AUTOTHERMAL STEAM REFORMATION OF METHANE IN A FLUIDIZED BED

This Application claims benefit of Prov. No. 60/100,520 filed Sep. 16, 1998.

FIELD OF THE INVENTION

The present invention relates to methods and apparatuses for low-temperature autothermal steam reformation of methane to produce hydrogen. In particular, it relates to a fluidized bed membrane reactor and its use.

BACKGROUND OF THE INVENTION

The production of hydrogen by catalytic steam reforming of a hydrocarbon such as methane is well known in the art. The steam and hydrocarbon reforming reaction is highly endothermic. Therefore, the reactor requires a heat input for the reaction to proceed. In general, processes where the required heat is generated outside the reactor and transferred to the reactor, so-called allothermic processes, are well-known and is usually accomplished by enclosing reactor tubes containing a catalyst within a fired furnace. The use of a furnace results in the generation of much thermal energy which must be recovered for economic reasons. Usually, this leads to the production of excess high-pressure steam which cannot always be properly used. As well, such processes are conventionally carried out at a relatively high temperature, usually between about 800° and 1000° degrees C. which creates metallurgical problems in the construction of the reactor and catalyst pipes.

In U.S. Pat. No. 5,326,550, the contents of which are incorporated herein by reference, Adris el al. teaches a method for producing hydrogen gas in a fluidized bed. In particular, it teaches the use of a circulating thermal fluid in heat pipes or heat exchangers embedded within the fluidized bed of a membrane reactor to maintain the reactor temperature in the required range. While the use of embedded heat pipes or heat exchangers represented an improvement over heating elements external to the reactor, this configuration still presents many drawbacks. The use of an embedded heat exchanger complicates the reactor construction and still requires the generation of heat energy in an external location, which is thermally inefficient and requires a considerable investment of energy and therefore significantly increases the cost of operating the reactor. Furthermore, the fluidized bed may not be completely temperature uniform as there will still be temperature gradients leading away from the heat exchanger tubes.

The Adris patent also teaches the use of a hydrogen-selective permeable membrane to separate hydrogen from the reacting gases. In general, membrane reactors are particularly suited for reactions which are equilibrium limited, as significant enhancement over the equilibrium conversion may be achieved by selectively removing one or more reaction products, such as hydrogen, through the membrane wall.

Processes where the required reaction heat is generated within the reaction system, or autothermal processes, using fixed or packed beds of catalyst are well-known but suffer from some significant disadvantages which tend to prevent their practice on an industrial scale. Isomura et al. in U.S. Pat. No. 5,741,474 alleviated the need for external heating by the addition of oxygen to a fixed bed reactor such that the heat generated by partial oxidation of the hydrocarbon provides heat necessary for reforming. Although this configuration represents an improvement in operational efficiency, the Isomura reactor utilizes a fixed bed configuration in which the rapid combustion reaction is expected to generate large temperature gradients and hot spots which may sinter the catalyst and damage the membrane. In particular, the heat-generating oxidation reaction occurs quickly in a region localized around the oxygen input.

In U.S. Pat. No. 5,714,092 issued to Van Looij et al., an autothermal process is disclosed which utilizes a fixed catalyst beds. A separate oxidation catalyst and reactor is provided in association with a reforming reactor. A separate oxidation catalyst is used to catalyze the oxidation of a hydrocarbon gas feed in order to provide the heat of reaction for the endothermic steam reformation reaction. The oxidation reactor is in-line with the reforming reactor such that the output gases from the oxidation reactor are heated to a sufficient level as they enter the reforming reactor. In general terms, this patent confirms the difficulties associated with previous attempts with internal hydrocarbon oxidation such as the creation of explosive mixtures and the formation of soot. This process attempts to solve these prior art difficulties by separating the oxidation reactor and the reformation reactor and by minimizing the size of the nickel catalyst.

The advantages of a fluidized bed reactor, as opposed to a fixed or packed bed, are well-known and include thermal uniformity, improved heat transfer, catalyst bed uniformity, and substantial elimination of diffusional limitations. However, there have not been any attempts to provide an autothermal fluidized bed reactor because most researchers believed that oxidation reactions required a high initiation temperature such that the hydrocarbon rapidly combusted. It was further believed that maintenance of a stable flame required a higher temperature than that required for the reforming reaction. It was widely reported that the ignition temperature for natural gas or propane was in the range of 800° to about 935° C. Furthermore, it was suspected that the combustion reaction would take place in the freeboard zone, rather than in the fluidized bed, thereby disrupting the reactor process instead of dissipating heat to the reactants in the fluidized bed. Previous research into methane combustion in fluid bed combustors (FBC) indicated that freeboard zone combustion was likely.

Therefore, there is a further need in the art for methods and apparatuses for low-temperature autothermal steam reformation of a hydrocarbon to produce hydrogen which may mitigate the disadvantages of the prior art.

SUMMARY OF THE INVENTION

This invention is directed at the surprising and unexpected discovery that pure hydrogen may be efficiently produced by employing a fluidized bed reactor to contain a steam/methane reforming reaction and a simultaneous oxygen/methane oxidation reaction under autothermal conditions.

In one aspect of the invention and in general terms, the invention comprises a process for producing hydrogen comprising the steps of:

a) providing a reaction vessel enclosing a fluidizable catalyst bed of a suitable particulate catalyst;

b) fluidizing the catalyst bed by introducing reacting gases comprising a mixture of preheated steam and hydrocarbon gas into the catalyst bed such that the fluidized bed forms a reaction zone;

c) introducing oxygen into the reaction zone;

d) oxidizing a portion of the hydrocarbon gas in the reaction zone;

e) reforming the hydrocarbon gas with the steam to produce hydrogen gas; and f) separating and collecting the hydrogen gas by means of a perm selective membrane.

In the preferred embodiment, the hydrocarbon gas is methane and the heat produced by the oxidation of a portion of the methane provides the heat of the reforming reaction, such that the process becomes autothermal.

In order for the process to be autothermal, sufficient oxygen must be added, relative to the amount of methane. The preferred ratio of oxygen input molar flow rate to methane input molar flow rate is between about 0.25 to about 0.65, and more preferably the ratio is about 0.45. The reaction zone temperature should controlled within the range of about 820 K to about 950 K. The preferred steam to methane ratio is at least 1.3, and more preferably the ratio is between about 2.0 and about 3.0.

It is preferred that the oxygen is distributed evenly within the reaction zone by means of a sparger or the like.

In another aspect of the invention and in general terms, the invention comprises a fluidized bed reactor for producing and separating hydrogen comprising:

a) a reactor vessel comprising a closed reaction chamber having a reaction zone and a freeboard zone, said reaction zone comprising a bed of a suitable fluidizable particulate catalyst;

b) a reaction zone pre-heater;

c) a steam inlet and a gaseous hydrocarbon inlet into the reaction zone;

d) an oxygen inlet for introducing oxygen into the reaction zone; and e) a tubular membrane for separating hydrogen and withdrawing hydrogen from the reaction chamber.

In the preferred embodiment, the reactor comprises a perforated distributor plate forming a floor of the chamber and said oxygen inlet is positioned above the distributor plate. The oxygen inlet is preferably a sparging tube or the like which distributes the oxygen evenly within the reaction zone. The reactor may further comprise means for controlling the heating means in response to autothermic or the absence of autothermic conditions within the reaction chamber.

The tubular membrane may preferably be metallic and comprised of one of palladium, niobium, tantalum or any suitable alloy thereof. Preferably, the tubular membrane is comprised of a niobium alloy having a palladium coating on both the external and internal surfaces of the membrane. More preferably, the tubular membrane may be internally reinforced with a coil spring to resist external crushing forces.

BRIEF DESCRIPTION OF THE DRAWINGS

The invention may be described with reference to the following the drawings:

FIG. 4 is a schematic representation of the preferred embodiment of the tubular membranes.

FIG. 4A is a cross-sectional view of a portion of a preferred tubular membrane.

DETAILED DESCRIPTION OF THE INVENTION

It is fundamentally important to the claimed invention that a substantially autothermal process is carried out in a fluidized bed. Unexpectedly, it has been found that the process may be autothermal at temperatures much lower than the previously observed ignition temperature for methane in a fluidized bed. Some researchers have observed that the ignition temperature for natural gas, which is primarily methane, is about 935° C. (1,208 K). Others have produced results which suggest that the ignition temperature may be as low as 780° C. (1,053 K). The present invention involves autothermal behaviour at temperatures less than any reported ignition temperatures, which was not previously thought possible.

The steam and methane reformation reaction is as follows:

$$CH_4 + H_2O + heat \leftrightharpoons CO + 3H_2 \qquad (1)$$

It is accompanied by the water-gas shift reaction as follows:

$$CO + H_2O \leftrightharpoons CO_2 + 3H_2 + heat \qquad (2)$$

Reaction (1) is reversible and highly endothermic. It is desired to drive this reaction to completion. Reaction (2) is slightly exothermic and also reversible. Both reactions will be favorably promoted by the removal of the produced hydrogen.

Figure 1:
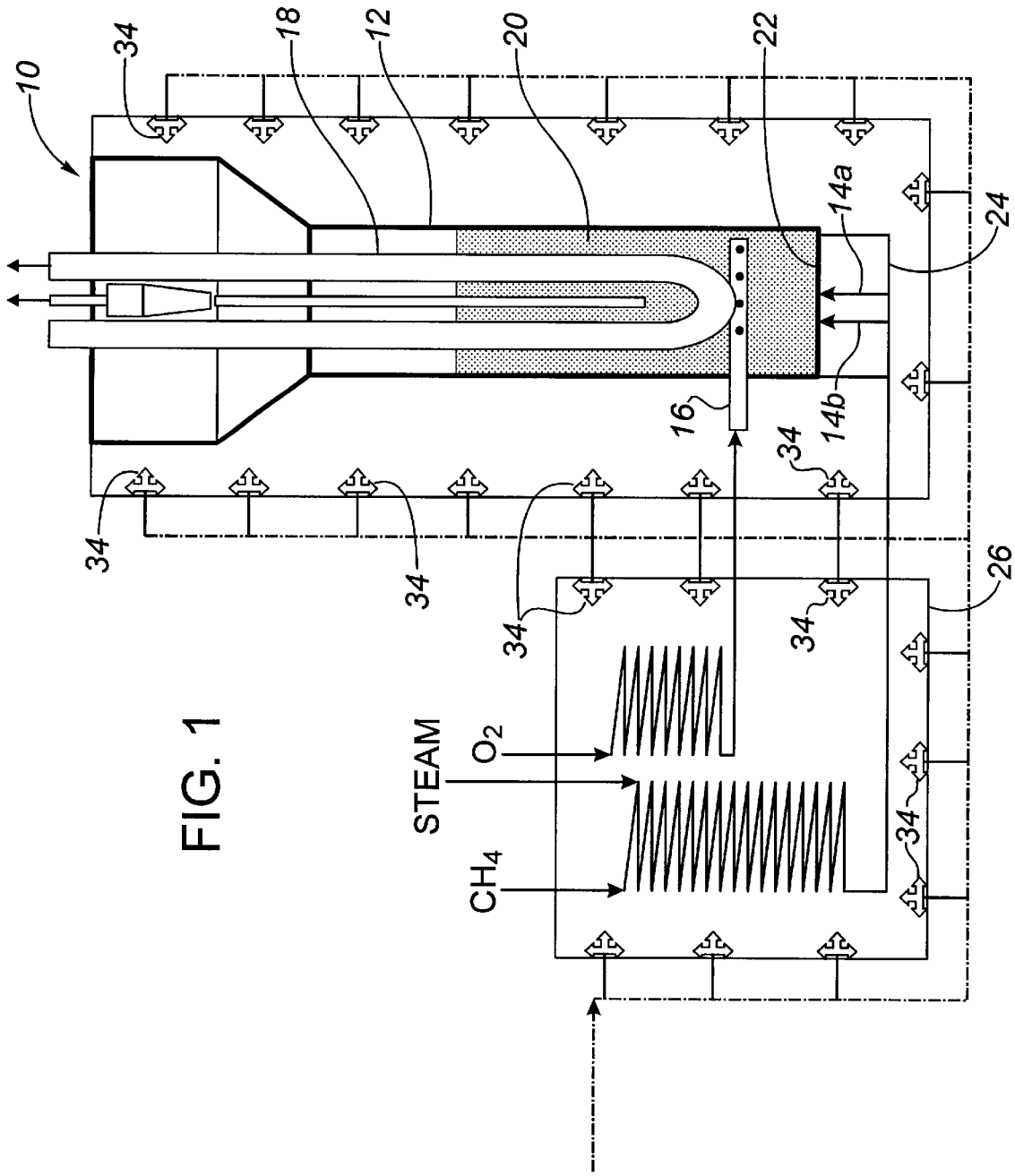
FIG. 1 is a schematic representation of a reactor in accordance with the present invention.
Figure 2:
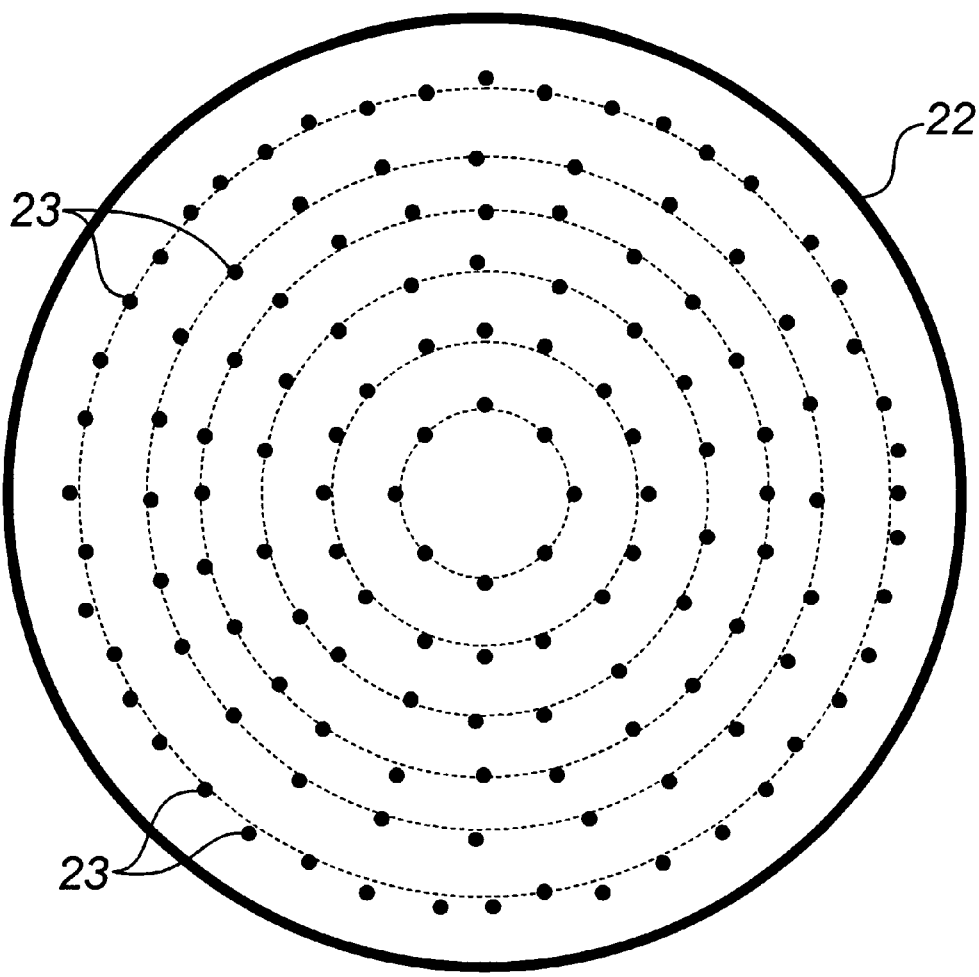
FIG. 2 is a plan view of a distributor plate used in the reactor.
Figure 2A:
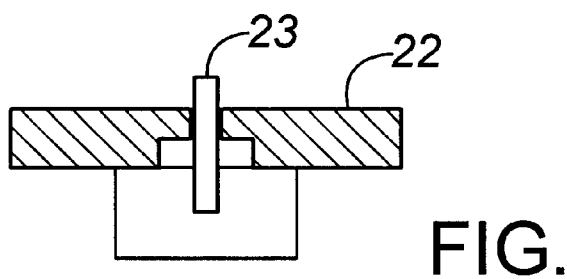
FIG. 2A is a cross-section of a distributor plate orifice.
Figure 3:
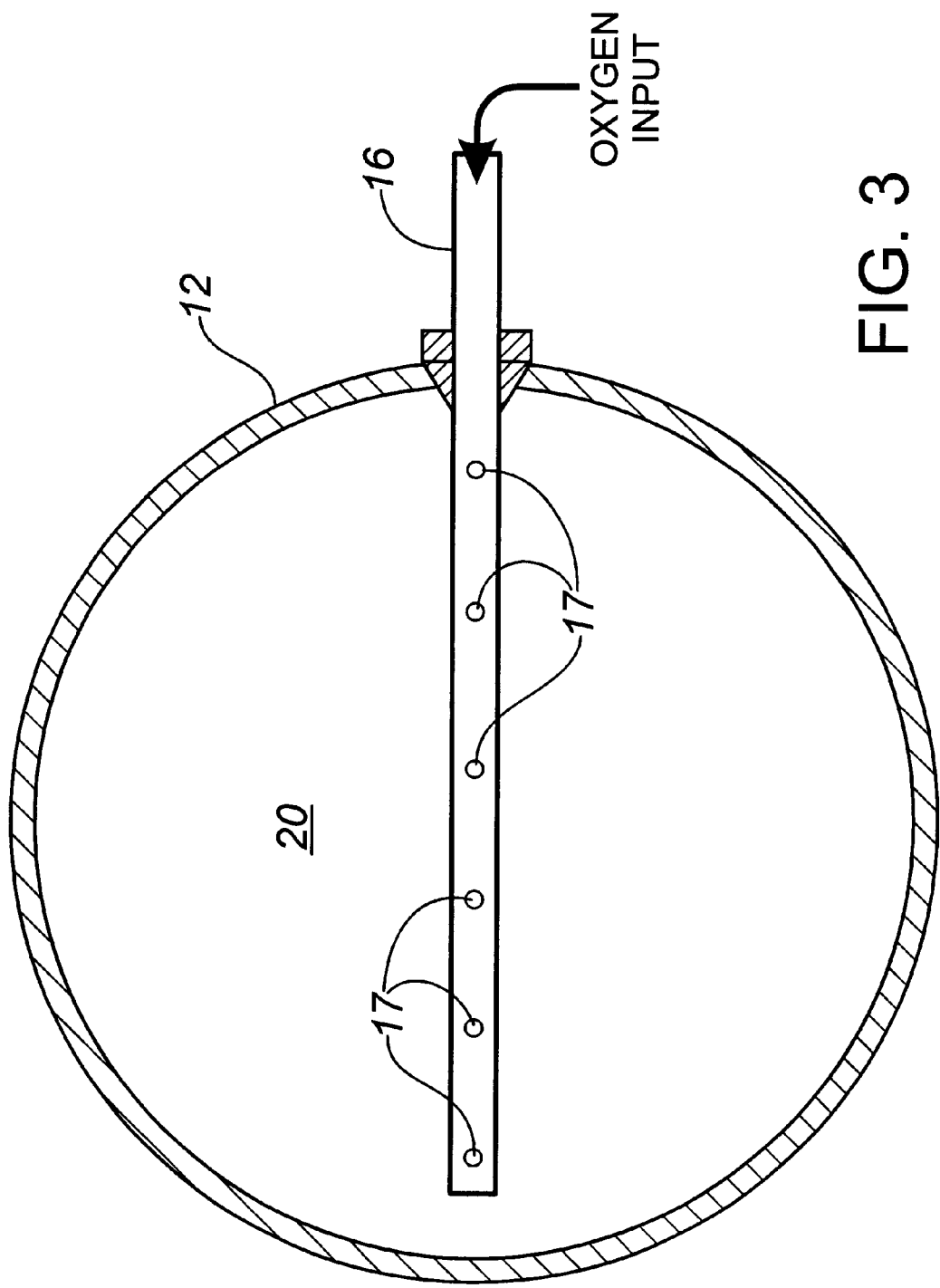
FIG. 3 is a cross-sectional view of the reactor showing the oxygen sparger.

In the present invention, these reactions take place within a reactor (10) schematically illustrated in FIG. 1 which comprises an enclosed reactor vessel (12), feed inlets (14) for methane (14a) and steam (14b), an oxygen inlet (16) and a separator membrane (18). The reactor vessel contains a fluidizable bed (20) of catalyst which is supported by a distributor plate (22) forming the floor of the reactor vessel (12). The distributor plate (22) allows for the reacting gases to pass through orifices (23) into the reactor vessel from a blow box (24) which is connected to the feed inlets (14a, 14b). Preferably, a preheat chamber (26) is used to preheat the reacting gases before they enter the blow box (24).

The addition of oxygen to the fluidized bed results in the oxidation of methane, represented by the following irreversible reaction:

$$CH_4 + 2O_2 \rightarrow 2H_2O + heat \qquad (3)$$

The resulting products are carbon dioxide and water. As well, carbon monoxide and hydrogen may also be produced, the amount of which depends on the amount of oxygen and the reforming/water gas shift equilibria. As expected, this oxidation of methane is a fast reaction and is highly exothermic. In the present invention, the heat energy generated by this reaction is used to provide the heat to drive the endothermic reforming reaction above. Therefore, the net effect of oxygen addition is to increase methane conversion, however, with a decreased hydrogen yield.

Oxygen is provided to the reactor vessel (12) by an oxygen inlet (16) which is preferably positioned above the distributor plate (22) within the fluidized bed (20). The inlet (16) is preferably a horizontally disposed tube or sparger (16) with multiple perforations in order to widely distribute the oxygen throughout the fluidized bed (20). The oxygen is also preheated in the preheat chamber (26). The sparger (16) is secured to the reactor vessel (12) by means of a high temperature fitting, as is well known in the art.

Because the temperature and pressure operating parameters of this reactor (10) and the methods of the present invention are not extreme, no special metallurgy is required and the components of the reactor (10) may be fashioned from ordinary stainless steel. In particular, the oxygen sparger (16) is not subjected to temperatures that are much higher than within the reactor generally because of the heat transfer capabilities and catalyst bed uniformity of the fluidized bed (20). It may be fashioned of stainless steel as opposed to the specialized nickel alloys required in other prior art reactor designs.

The hydrogen produced from the inventive process may be separated through separator membranes (18) made of any suitable material which partially or perfectly selectively transmit hydrogen while tending to prevent the transmission of the other gases present within the reactor vessel. Such materials are well-known in the art. In the preferred embodiment, tubular membranes made of a niobium alloy having a very thin palladium coating are used. More preferably, these membranes are U-shaped and internally spring-reinforced as is shown in the Figures.

The fluidizable catalyst bed (20) is comprised of a plurality of catalyst particles (21) which may be fluidized by the movement of the reacting gases passing up through the distributor plate (22). The catalyst particles act as an internal heat carrier in the bed (20) which provides a more uniform reactor temperature throughout the bed (20). Suitable particulate catalysts are well-known in the art and include nickel, platinum and rhodium. The particular catalyst used will depend on the specific reactions and conditions intended. For example, a nickel catalyst supported over an a-alumina substrate has been found satisfactory for the reactions and conditions disclosed herein. The catalyst particles (21) should have a particle size range of about 20 to 355 microns with mean diameters in the range of about 60 to 200 microns in order to be conveniently fluidizable.

In an experimental embodiment, electric heaters (not shown) were provided to heat the fluidized bed and the reactor vessel at startup until the process became autothermal. In a preferred embodiment, the reaction vessel (12) is enclosed and gas burners (34) are provided to heat the reactor vessel (12) at startup. Autothermal operation is defined as where sufficient heat energy is provided by the oxidation of methane to drive the steam/methane reformation reaction such that no additional heat source is required, other than the preheater (28) for the reacting gases and the oxygen. At startup, the fluidized bed (20) must be heated and pressurized.

In the preferred embodiment, the feed gases may be preheated utilising a gas fired preheater (26) and are introduced to the catalyst bed (20) at flow rates well above the minimum fluidization velocity. Persons skilled in the art will be able to determine such flow rates without difficulty. The oxygen is then introduced at 400° C. or greater to assist in heating the fluidized bed. During startup procedures, the reactor (10) may be heated using gas fired burners (34) and recirculating hot gases until the catalyst bed temperature reaches 350° C. and then the feed gases are introduced into the reactor (10). As the bed (20) approaches the desired temperature and pressure, feed gas flows may then be increased. It is preferable to preheat the reactor to at least 300° C. prior to introducing the feed gases to prevent damage to the superficial palladium layer of the membranes (30), because pinholes or cracks could be formed by phase transformation of palladium hydride from the a to the P-phase on exposure to hydrogen at temperatures below 300° C.

In the preferred embodiment, a control circuit (not shown) is provided to turn off the electric heaters (not shown) or gas burners (34) once the desired reactor temperature or autothermal conditions have been reached. The control circuit may comprise a thermocouple within the reactor connected to a control mechanism which is operatively connected with the electric heaters (not shown) or gas burners (34). The design and implementation of such a control circuit is well-known to those skilled in the art.

The conditions of the present invention are such that rapid combustion of methane does not occur. In the absence of steam, equivalence ratios less than 1.5 may result in the formation of explosive mixtures of oxygen and methane. However, the presence of steam in the feed allows the use of equivalence ratios approaching this lower level. The equivalence ratio is calculated by dividing the actual ratio of fuel to oxygen by the stoichiometric ratio of fuel to oxygen. Preferably, the present invention utilizes equivalence ratios of between 3.0 and 8.0.

This falls outside the homogenous ignition limit of methane in the absence of steam. Of course, the presence of steam in the feed further ameliorates the risk of creating explosive mixtures of methane and oxygen.

The process of the present invention may be used to produce pure hydrogen, however, it is preferred to use a sweep gas on the membrane side to remove the hydrogen, resulting in a mixture of hydrogen and the sweep gas. Use of a sweep gas is preferred because it increases hydrogen permeation as a result of the reduction of the partial pressure of hydrogen on the membrane side. Suitable sweep gases are well-known in the art and include nitrogen or steam.

The invention may be more fully understood by reference to the following selected non-limiting examples, derived from experimental data, which illustrate the effect of varying certain operating variables referred to below. It will be understood that in practice, these variables are interrelated and varying one will often effect the others unless controls are utilized to stabilize the other variables. There are four important variables which may be manipulated in the process of the present invention: oxygen/methane ratio, steam/methane ratio, reactor pressure and reactor temperature.

EXAMPLE 1

It has been found that while oxygen levels must reach a certain level to maintain autothermal conditions, increasing the oxygen input flow rate beyond this point decreased hydrogen yield slightly and permeate flow negligibly, as is demonstrated in the results shown in Table 1 below. In this example, oxygen flowrates were varied from about 14.7 mol/h to about 21 mol/h while the following variables were constant:

| | |
|---|---|
| Pressure = 0.68 MPa | Sweep Gas pressure = 0.14 MPa |
| Temp. = 923 K | Sweep Gas flowrate = 45 mol/h |
| Methane flowrate = 33.74 mol/h | |
| Steam flowrate = 138 mol/h | |

Thus, the oxygen to methane ratio was varied from about 0.44 to about 0.62 while the steam to methane ratio was kept constant at 4.0.

TABLE 1

Oxygen input variation

| Oxygen Flowrate mol/h | Methane Conversion % | Hydrogen Yield | Hydrogen Permeate rate mol/h | Hydrogen Recovery % |
|---|---|---|---|---|
| 14.7 | 76.01 | 1.95 | 18.6 | 28.2 |
| 15.2 | 77.2 | 1.93 | 18.6 | 28.6 |
| 16.8 | 79.1 | 1.93 | 18.5 | 27.7 |
| 18.9 | 81.1 | 1.91 | 17.6 | 27.3 |
| 21.0 | 82.2 | 1.88 | 17.1 | 27.0 |

Therefore, oxygen flow should be preferably kept at a minimum to maximize hydrogen production while remaining sufficient for autothermal behaviour. Autothermal conditions were reached under experimental conditions in the pilot plant with an oxygen to methane ratio of 0.45 and higher.

Theoretically, based on the respective thermodynamic heats of reaction for steam reformation and methane oxidation, 20% of the methane must be oxidized to produce enough heat to drive the steam reformation reaction. Therefore, 0.4 mols of $O_2$ should be added for every 1 mol of methane. However, in practice, significant heat is lost from the reactor and is consumed as sensible heat in heating the reactants. These factors are counter-acted by the fact that the methane conversion rate is less than 100%. As a result, oxygen/methane ratios may approximate the theoretical level of 0.4 for autothermal behaviour.

It is expected that lower oxygen/methane ratios may be achieved in a commercial scale reactor than those in this example. Heat losses are higher in the experimental setup due to the high surface/volume ratio of the reactor. Also the preheat temperatures in the commercial unit may be considerably higher, thereby reducing the sensible heat requirement. Both of these factors will lead to lower oxygen/methane ratios required for autothermal operation.

EXAMPLE 2

It has been found that higher steam-methane ratios result in higher hydrogen yields as is shown in Table 2 below. However, it has also been found that hydrogen permeate flow decreases marginally when the steam to methane ratio increases, due to the reduction in the hydrogen partial pressure which results from higher steam-methane ratios. In the example shown, the steam flowrate was kept constant at 138 mol/h while the methane flowrate was varied from 58.0 to 33.7 mol/h to vary the steam-methane ratio. Oxygen molar flowrate was kept at a constant 35% of the methane molar flowrate. Temperature was maintained at 923K while the pressure was maintained at 0.68 Mpa. Sweep gas pressure and flowrate were 0.14 Mpa and 45 mol/h respectively.

TABLE 2

Steam-methane ratio variation

| Steam-methane ratio | Methane Conversion % | Hydrogen Yield | Hydrogen Permeate rate mol/h | Hydrogen Recovery % |
|---|---|---|---|---|
| 4.1 | 73.6 | 1.98 | 19.1 | 28.6 |
| 3.1 | 65.7 | 1.67 | 20.5 | 27.3 |
| 2.4 | 58.5 | 1.40 | 21.4 | 26.6 |

The presence of steam helps to prevent coke formation which can foul the catalyst. Therefore, at a minimum the steam-methane ratio should be kept over 1.3 in order to assist in preventing coke formation in the fluidized bed. Preferably, the steam to methane ratio should be maintained at about 2.4:1 or lower to maximize hydrogen permeation through a membrane.

It has been found that coke formation is less of a problem in fluidized bed reactor of the present invention, because of the constant movement of the catalyst particles within the fluidized bed. Carbon-fouled particles are recirculated to oxygen-rich zones of the bed where the coke is combusted.

EXAMPLE 3

It has been found that permeation rates through the tubular membranes increases at higher pressures even though methane conversion and hydrogen yields decrease because the partial pressure of hydrogen increases correspondingly. As shown in Table 3, permeation rates rise as the pressure is varied from 0.68 MPa to 1.0 Mpa. In general, hydrogen recovery may be enhanced by increasing the pressure within safe limits which are distributed by the pressure capacity of the reaction vessel. Also, the tubular membranes used in the present invention are known to collapse when subjected to very high trans-membrane pressure differentials. Therefore, the use of internally reinforced tubular membranes is preferred because higher internal reactor pressures may be utilized.

TABLE 3

Pressure variation in FBMR with oxygen input
(T = 873 K; Methane flowrate = 33.74 mol/h; Steam flowrate = 138.33 mol/h; Sweep gas pressure = 0.14 MPa; Sweep gas flowrate = 45 mol/h: $O_2$: $CH_4$ = 0.45)

| Reactor Pressure (MPa) | 0.68 | 0.78 | 0.88 | 0.99 |
|---|---|---|---|---|
| Methane Conversion(FBMR with $O_2$) | 68.1 | 66.6 | 63.5 | 61.9 |
| Methane Conversion (FBMR) | 60.0 | 57.5 | 54.7 | 53.0 |
| Methane Conversion (Equil. Without $O_2$) | 48.0 | 45.7 | 43.9 | 42.2 |
| Hydrogen Yield (FBMR with $O_2$) | 1.58 | 1.59 | 1.54 | 1.49 |
| Hydrogen Yield (FBMR) | 2.35 | 2.22 | 2.14 | 2.13 |
| Hydrogen Permeate rate (FBMR with $O_2$) | 14.8 | 16.0 | 16.3 | 17.0 |
| Hydrogen Permeate rate (FBMR) | 22.9 | 24.1 | 25.1 | 27.0 |

EXAMPLE 4

It has been found that both methane conversion and hydrogen yield increase with increasing temperature. As shown in Table 4, hydrogen yield increases approximately 33% as the reactor temperature is increased from about 850 K to about 950 K. The hydrogen permeation rate increases accordingly. Therefore, it is preferable to maintain a steady state temperature at about 950 K or greater, within the limits of a reactor having ordinary metallurgical construction, thereby avoiding costly heat refractory materials such as Inconel™ or the like. The temperature should also be below the spontaneous ignition point of methane in a fluidized bed.

TABLE 4

Temperature variation in FBMR with oxygen input
(P = 0.68 MPa; Methane flowrate = 33.74 mol/h; Steam flowrate = 138.33 mol/h; Sweep gas pressure = 0.14 MPa; Sweep gas flowrate = 45 mol/h; $O_2$: $CH_4$: 0.45)

| Reactor Temperature (K) | 849 | 873 | 898 | 922 |
|---|---|---|---|---|
| Methane Conversion (FBMR with $O_2$) | 61.7 | 66.8 | 72.7 | 77.2 |
| Methane Conversion (FBMR) | 49.7 | 59.0 | 67.7 | |

TABLE 4-continued

Temperature variation in FBMR with oxygen input
(P = 0.68 MPa; Methane flowrate = 33.74 mol/h; Steam flowrate = 138.33 mol/h; Sweep gas pressure = 0.14 MPa; Sweep gas flowrate = 45 mol/h; $O_2$: $CH_4$: 0.45)

| | | | | |
|---|---|---|---|---|
| Methane Conversion (Equil. Without $O_2$) | 41.9 | 47.7 | 54.5 | 61.3 |
| Hydrogen Yield (FBMR with $O_2$) | 1.49 | 1.60 | 1.82 | 1.93 |
| Hydrogen Yield (FBMR) | 1.91 | 2.20 | 2.58 | |
| Hydrogen Permeate rate (FBMR with $O_2$) | 14.6 | 15.9 | 17.5 | 18.6 |
| Hydrogen Permeate rate (FBMR) | 19.0 | 21.0 | 24.5 | |

As will be apparent to those skilled in the art, various modifications, adaptations and variations of the foregoing specific disclosure can be made without departing from the teachings of the present invention.

What is claimed is:

1. An autothermal process for producing hydrogen comprising the steps of:
   a) providing a reaction vessel enclosing a fluidizable catalyst bed of a suitable particulate catalyst;
   b) fluidizing the catalyst bed by introducing reacting gases comprising a mixture of preheated steam and hydrocarbon gas into the catalyst bed such that the fluidized bed forms a reaction zone;
   c) introducing oxygen into the reaction zone;
   d) oxidizing a portion of the hydrocarbon gas in the reaction zone;
   e) reforming the hydrocarbon gas with the steam to produce hydrogen gas in the reaction zone; and
   f) separating and collecting the hydrogen gas by means of a perm selective membrane.

2. The process of claim 1 wherein the hydrocarbon gas is methane.

3. The process of claim 2 wherein the heat produced by the oxidation of a portion of the methane provides the heat of the reforming reaction.

4. The process of claim 3 wherein the reaction zone temperature is controlled by varying the oxygen flow rate, relative to the methane flow rate, into the reaction zone.

5. The process of claim 4 wherein the ratio of oxygen input flow rate to methane input flow rate is between about 0.25 to about 0.65.

6. The process of claim 4 wherein the reaction zone temperature is controlled within the range of about 820 K to about 950 K.

7. The process of claim 4 wherein the steam to methane ratio is at least 1.3.

8. The process of claim 7 wherein the steam to methane molar feed ratio is between about 2.0 and about 3.0.

9. The process of claim 1 wherein the oxygen is distributed evenly within the reaction zone by means of a sparger.

* * * * *